United States Patent [19]
Chigrinov et al.

[11] Patent Number: 5,838,407
[45] Date of Patent: *Nov. 17, 1998

[54] LIQUID CRYSTAL DISPLAY CELLS

[75] Inventors: Vladimir Grigorievich Chigrinov; Vladimir Marcovich Kozenkov; Nicolic Vasilievich Novoseletsky, all of Moscow, Russian Federation; Victor Yurievich Reshetnyak; Yuriy Alexandrovich Reznikov, both of Kiev, Ukraine; Martin Schadt, Seltisberg, Switzerland; Klaus Schmitt, Lörrach, Germany

[73] Assignee: ROLIC AG, Zug, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 601,310

[22] Filed: Feb. 16, 1996

Related U.S. Application Data

[63] Continuation of Ser. No. 373,733, Jan. 17, 1995, abandoned, which is a continuation of Ser. No. 271,550, Jul. 7, 1994, abandoned, which is a continuation of Ser. No. 125,005, Sep. 21, 1993, abandoned, which is a continuation of Ser. No. 910,066, Jul. 8, 1992, abandoned.

[30] Foreign Application Priority Data

Jul. 26, 1991 [CH] Switzerland ............................ 2246/91
Jan. 14, 1992 [CH] Switzerland ............................ 100/92

[51] Int. Cl.$^6$ .................................................. G02F 1/1335
[52] U.S. Cl. ............................................................ 349/187
[58] Field of Search ............................ 359/75, 76, 78; 379/119, 117

[56] References Cited

U.S. PATENT DOCUMENTS

| | | |
|---|---|---|
| 4,893,907 | 1/1990 | Mallinson . |
| 4,952,030 | 8/1990 | Nakagawa et al. . |
| 4,975,347 | 12/1990 | Ahne et al. . |
| 5,186,986 | 2/1993 | Ogawa . |
| 5,246,748 | 9/1993 | Gillberg-Laforce et al. . |
| 5,249,070 | 9/1993 | Takano ....................................... 359/54 |
| 5,473,455 | 12/1995 | Koike et al. ............................... 359/76 |

FOREIGN PATENT DOCUMENTS

| | | |
|---|---|---|
| 249 311 | 12/1987 | European Pat. Off. . |
| 387 059 | 9/1990 | European Pat. Off. . |
| 445 629 | 9/1991 | European Pat. Off. . |
| 3 234 074 | 3/1984 | Germany . |
| 2 912 467 | 10/1990 | Germany . |
| 54-5754 | 1/1979 | Japan . |
| 56-138713 | 10/1981 | Japan ....................................... 359/76 |
| 3 111 818 | 5/1991 | Japan . |
| 4-7520 | 1/1992 | Japan . |

(List continued on next page.)

OTHER PUBLICATIONS

Abstract for Document B11 — Japanese Patent Application 2–109280.
Abstract for Document B12 — JP–A 2–196219.
Abstract for Document B13 — JP–A 2–211425.
Abstract for Document B14 — JP–A 54–5754.
Abstract for Docuemnt B15 — JP–A 63–106624.
Derwent Abstract No. AN–84–069995/12.
Okazaki, M., Nikkei High Tech Report Bd IV, No. 5, (Jan. 9, 1989) Tokyo, Japan.

(List continued on next page.)

*Primary Examiner*—William L. Sikes
*Assistant Examiner*—James Dudek
*Attorney, Agent, or Firm*—Bryan Cave LLP

[57] ABSTRACT

In liquid crystal display cells comprising a liquid crystal (7) disposed between two substrate plates (1,2) provided with drive electrodes (3,4), the orientation layer (5,6) on the inner sides of the plates where the electrodes are disposed comprises an oriented photopolymer layer. This layer is formed by irradiating photopolymer layer. This layer is formed by irradiating photoreactive material with linear polarized light.

6 Claims, 2 Drawing Sheets

FOREIGN PATENT DOCUMENTS

| | | | |
|---|---|---|---|
| 60-60624 | 4/1985 | Japan | 359/76 |
| 0 011 725 | 1/1986 | Japan . | |
| 0 051 124 | 3/1986 | Japan . | |
| 0 121 035 | 6/1986 | Japan . | |
| 0 091 920 | 4/1987 | Japan . | |
| 63-106624 | 5/1988 | Japan . | |
| 1-210932 | 8/1989 | Japan | 359/76 |
| 2-55330 | 2/1990 | Japan | 359/76 |
| 2-196219 | 8/1990 | Japan . | |
| 2-211425 | 8/1990 | Japan . | |

OTHER PUBLICATIONS

Patent Abstracts of Japan, vol. 14, No. 98 (P–1011) (Feb. 22, 1990) — JP–A–1 303 412.

Patent Abstracts of Japan, vol. 10, No. 72 (P–438) (2129) (Mar. 22, 1986) — JP–A–60 211 427.

Patent Abstracts of Japan, vol. 12, No. 114 (P–688) (2961) (Apr. 12, 1988) — JP–A–62 245 218.

Patent Abstracts of Japan, vol. 12, No. 235 (P–725) (3082) (Jul. 6, 1988) — JP–A–63 027 815.

LIQUID CRYSTAL DISPLAY CELLS

This is a continuation, of application Ser. No. 08/373,733, filed Jan. 17, 1995, now abandoned which is a Rule 60 Continuation of Ser. No. 08/271,550, filed Jul. 7, 1994, now abandoned, which is a Continuation of Ser. No. 08/125,005, filed Sep. 21, 1993, now abandoned, which is a Rule 62 Continuation of Ser. No. 07/910,066, filed Jul. 8, 1992, now abandoned.

FIELD OF THE INVENTION

The invention relates to liquid crystal display cells comprising an oriented liquid crystal disposed between two plates (substrates) provided with transparent electrode layers and orientation layers.

BACKGROUND OF THE INVENTION

In liquid crystal display cells based on an electric field effect, the glass or plastic plates bounding the liquid crystal have provided on their surfaces which face the liquid crystal, coatings which orient the immediately adjacent liquid crystal molecules along a preferred direction. This applies to liquid crystal displays based on the so-called rotation cell (twisted-nematic, TN) effect and displays based on a higher twisting, e.g. so-called super twisted nematic (STN) cells, as well as, finally, also to ferroelectric liquid cells.

Hitherto the wall orientation of the liquid crystal molecules in display cells has been achieved either by oblique vapor deposition of $SiO_x$ on the substrate surface or, as is currently done, almost exclusively by mechanical treatment (abrasion) of a polymer layer previously applied to the substrate surface(s). This abrasion method does not enable selective areas of the substrate surface to be provided with a preferred orientation. In particular, it is not possible by previous methods to manufacture orientation patterns such as e.g. a wall orientation varying from pixel to pixel. Moreover, the modern almost exclusively-used method of abrading a polymer layer frequently reduces the efficiency in producing actively addressed twisted cells, since the electrostatic charge on the substrate produced by abrasion results in electric breakdowns in the thin film transistors on the substrate surface.

SUMMARY OF THE INVENTION

An object of the invention is to provide a novel and improved method of surface orientation of liquid crystals, which avoids the disadvantages of the known methods and above all enables orientation patterns to be manufactured.

This is achieved according to the invention by applying, in the case of a liquid crystal cell of the kind mentioned above, oriented photopolymer layers to the inner sides of the plates which are provided with the electrodes, said layers aligning the adjacent liquid crystal molecules in a preferred direction.

For the purpose of the present description, the term "photopolymers" is used for polymers or composition of polymers which are photochemically modified by polarized light. Reference is also made to Swiss Patent Application No. 2244/91 entitled "Orientierte Photopolymere und Verfahren zu deren Herstellung" which is incorporated by reference.

It has now surprisingly been found that oriented photopolymer layers, i.e. photopolymers modified by irradiation with linear polarized light, orient liquid crystals, which come into contact with them, in a preferred direction. This does not apply only in respect of the preferred direction parallel to the plates. An angle of tilt in the direction right angles to the plates can also be induced by the orientated photopolymers.

Thereby, the manufacture of surface orientation layers in liquid crystal display cells without vapor deposition of $SiO_x$ and without abraded polymers is made possible for the first time.

The use of photopolymer orientation layers also permits for the first time the production of orientation patterns by the irradiation of photographic masks with linear polarized light having a desired oscillation direction and the formation of an image on the coated substrate. Alternatively, interferometric imaging techniques can be used (polarized holograms).

Embodiments of the invention will be illustrated in detail hereinafter with reference to the accompanying drawings and Examples.

DETAILED DESCRIPTION OF THE INVENTION

The invention concerns liquid crystal display cells having a liquid crystal disposed between two plates having electrode layers provided thereon. Orientation layers comprised of oriented photopolymers are provided on the inner sides of the plates where the electrodes are disposed. The oriented photopolymers having a predetermined molecular orientation.

Preferably, the direction on the two plates are different.

Particularly preferably, a nematic liquid crystal is plane-oriented by the orientation layers in a preferred direction, the angle $\theta$ between the nematic director and the substrate surface being $0 \leq \theta << 85°$.

In accordance with a preferred embodiment of the invention, a pattern of regions with different preferred orientations or a pattern of regions with preferred orientation and non-oriented regions is present.

In accordance with a further preferred embodiment, the two plates have different orientation patterns differing by different preferred orientations, which leads to different angles of twisting.

Figure 1:
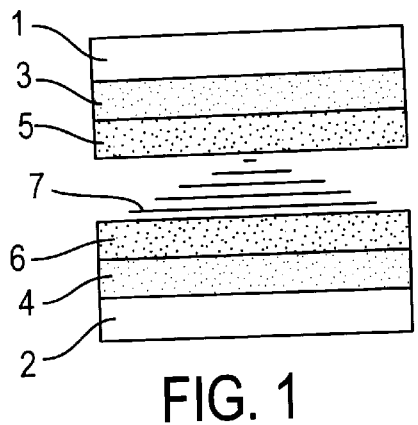
FIG. 1 shows a liquid crystal display cell according to the invention.

The liquid crystal cell shown schematically in section in FIG. 1 consists of two transparent plates 1, 2 and a liquid crystal layer 7 between them. The two plates of glass or plastic are provided with control electrodes 3, 4 and with overlying orientation layers 5, 6. In contrast to previously-known liquid crystal cells, the orientation layers consist of oriented photopolymer.

Figure 2:
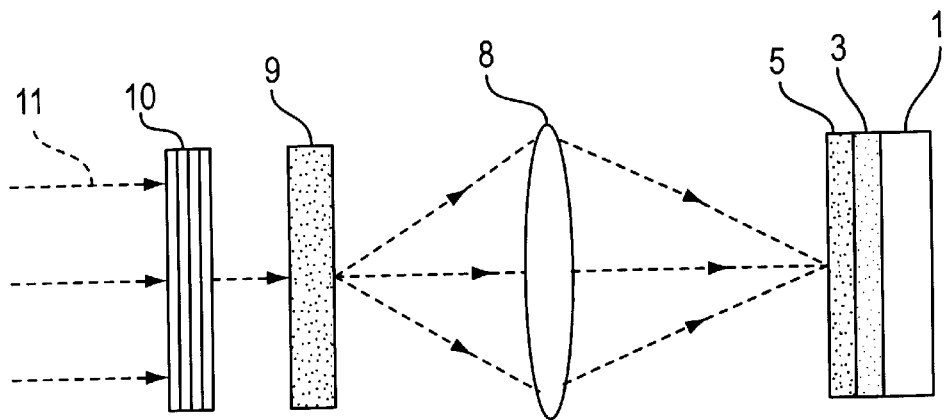
FIG. 2 shows a device for the manufacture of an orientation layer.

In the device shown in FIG. 2 for the manufacture of the oriented photopolymer layers, a glass plate 1 is provided with a transparent conductive electrode layer 2 and with a layer 3 of a photoreactive organic material. The layer is irradiated with linear polarized light by means of a lens 4 behind a mask 5. The light comes from a polarizer 6 which is illuminated with non-polarized UV light 7.

Figures 3A, 3B:
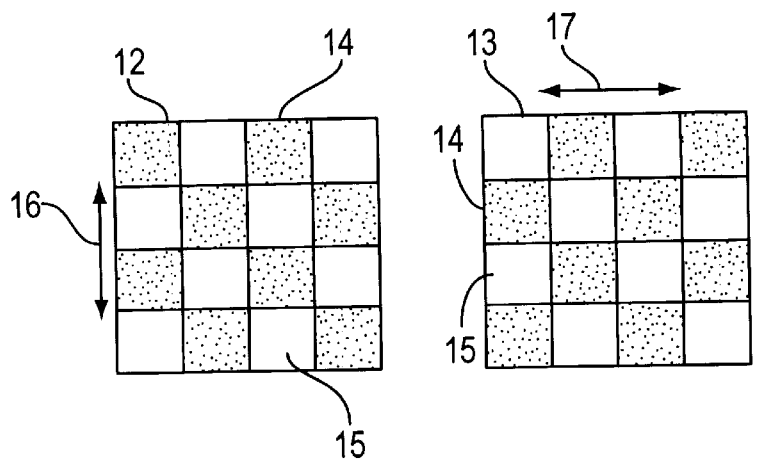
FIG. 3 shows a set of masks for use in the device in FIG. 1.

The mask 5 is shown in FIG. 3 as a set of masks comprising two complementary masks 8, 9; in other words, a positive mask 8 (FIG. 3a) and a negative mask 9 (FIG. 3b). The two masks have a chessboard pattern, i.e. they cover alternating squares 10 of equal size over the entire cell surface and leave other square surfaces 11 exposed.

Irradiation through the positive mask 8 with linear polarized light having the direction of polarization indicated by the arrow 12 brings about the oriented photomodification of the non-masked areas of photoreactive layer 2. After this first step, the mask 8 is replaced by the negative mask 9 and the photoreactive layer 3 is irradiated with light having a direction of polarization rotated through 90° as shown by arrow 12. The now exposed areas of the layer are polymerized with a corresponding twisted orientation.

When complete photomodification has been achieved in the first step, no mask is necessary for the second step, because the orientation induced in the first step is maintained.

Figure 4:
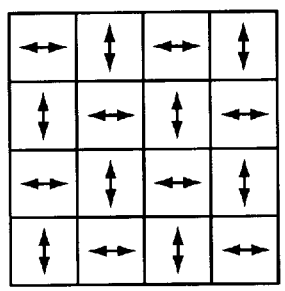
FIGS. 4–5 show various orientation patterns resulting from illumination with the set of masks according to FIG. 3.

An orientation pattern in the photopolymer layer as shown in FIG. 4. results by this two-stage irradiation with different masks and different linear polarized light. The predetermined orientation of the polymer layers is offset from one adjacent square region to another. In a liquid crystal cell constructed from plates coated in this manner, the liquid crystal molecules are oriented in accordance with the changing orientations of the photopolymer layer.

Instead of orientation offset by 90° from area to area, other combinations of angles are also possible. Above all, opposite regions in the cell can be oriented in directions such that the angles of twist or the pitches of the intermediate parts of the liquid crystal vary from region to region. In this manner, TN regions and STN regions can be obtained side by side in a single display by suitable chiral doping of the nematic liquid crystal. This can be of significance if a display has to show a large area of information together with complex items, e.g. requiring multiplex control. Also, various strongly twisted STN cells can be achieved in one and the same display.

Figure 5:
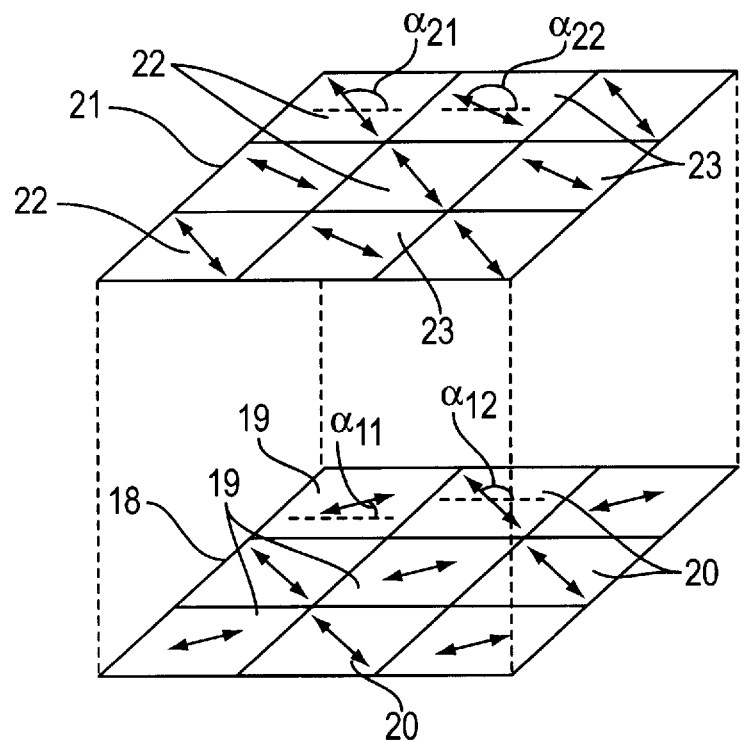

One example of such a display is shown in FIG. 5, in which a liquid crystal is disposed between pixels having a first helix angle $\phi_1$ of the liquid crystal and pixels having a second helix angel $\phi_2$ thereof. Both plates are shown having the preferred orientations.

The bottom plate 14 has a preferred orientation $\alpha_{11}$ in a first group 15 of areas disposed in a grid, and a preferred orientation $\alpha_{12}$ in a second group 16, where $\alpha$ is the angle of the preferred orientation relative to an edge of the substrate.

Correspondingly, the top plate 17 has a preferred orientation $\alpha_{21}$ in a first group 18 of areas and a preferred orientation $\alpha_{22}$ in a second group 19 of areas. If the plates are suitably adjusted, the helix angle in the liquid crystal between them is $\phi_1=\alpha_{11}-\alpha_{12}$ or $\phi_2=\alpha_{21}-\alpha_{22}$. Stable helix configurations with uniform direction of rotation and 70° $|\phi_1-\phi_2| \leq 220°$ can be achieved by doping with cholesteric additives, which bring about suitable natural twisting in known manner.

Some Examples which have been carried out are described hereinafter in order to further illustrate the invention.

EXAMPLE 1

A glass plate was coated with a 2% solution of polyvinyl cinnamate (mol. wt. ~15000) in methyl cellosolve acetate in a spin-coating process at 3000 rpm for about 30 seconds. The thickness of the resulting layer was about $0.1\mu$. The layer then was dried in air for about 20 minutes and then heated to about 80°–90° C. for about 20 seconds. After this pre-treatment the layer was exposed for about 100 seconds. to irradiation with linear polarized light from an HgHP lamp at a wavelength $\lambda$ of about 365 nm, first through a positive mask 8 and then through a complementary or negative mask 9 at a direction of polarization rotated through 90°. The irradiation energy in each case was about 15 mW/cm².

The plates which had been thus pre-treated were used in a manner known per se to construct a cell which was filled with a nematic liquid crystal. Exact adjustment may be necessary depending on whether one or both plates have an orientation pattern. It was found that the liquid crystal layer had planar orientation in two preferred directions, i.e. the nematic director of the liquid crystal layer was aligned in accordance with the changing orientation in the photopolymer layers.

EXAMPLE 2

In a procedure similar to Example 1, a layer of a solution of a polyvinyl ester of paramethoxycinnamic acid (molecular weight about 15000–50000) in chlorobenzene and dichlroethylene 1:1 was exposed to irradiation at about 0.5 J/cm² for about 10 seconds. The resulting layer likewise induced parallel orientation in an adjacent liquid crystal.

EXAMPLE 3

A glass plate was coated with a 1% solution of

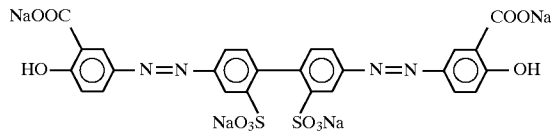

in an immersion process in water. The resulting layer had a thickness of about $0.07\mu$ and was irradiated with linear polarized light at a wavelength $\lambda=400–500$ nm and a radiation intensity of about 47 mW/cm² for about 8 minutes.

A liquid crystal cell made of thus-coated plates was filled with a nematic liquid crystal and, to improve the orientation of the liquid crystal, was heated to 100° C. for about 5 minutes until the liquid crystal reached its isotropic state, and was then cooled. The liquid crystal then had planar orientation.

EXAMPLE 4

A 3% solution of

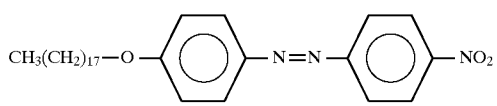

in chloroform was vapor-deposited on a glass plate. The resulting layer, about 1000–2000 Å thick, was irradiated with light at wavelength $\lambda\approx400–550$ at an intensity of about 45 mW/cm² for about 3 minutes.

The thus-coated plates were used as in Example 3 to construct a liquid crystal cell, in which the liquid crystal had planar orientation as before.

EXAMPLE 5

Example 1 was repeated except that non-polarized light instead of plane-polarized light was used in the second illumination step. After the liquid crystal cell had been assembled, it was found that the regions photomodified with plane-polarized light gave a planar orientation in a predetermined direction to the liquid crystal layer, whereas the liquid crystal did not have a predetermined direction in the regions irradiated with non-polarized light.

What is claimed is:

1. A liquid crystal display cell comprising an oriented liquid crystal layer disposed between two plates which are provided with transparent electrode layers disposed on the inner sides of said plates, and orientation layers disposed on the inner sides of the electrode layers and aligning the adjacent liquid crystal molecules in predetermined directions, at least one of said orientation layers comprising an oriented linearly polarized light modified photopolymer.

2. The liquid crystal display cell according to claim 1, wherein the predetermined directions on the two plates are different.

3. The liquid crystal display cell according to claim 1, wherein a nematic liquid crystal is linearly oriented by the orientation layers in a predetermined direction, the tilt angle θ between the nematic direction and the substrate surface being between $0 \leq \theta < 85°$.

4. The liquid crystal display cell according to claim 1, further comprising a pattern of regions with different predetermined orientations.

5. The liquid crystal display cell according to claim 1, further comprising a pattern or regions with predetermined orientation and non-oriented regions.

6. The liquid crystal display cell according to claim 3, wherein the two plates have different orientation patterns differing with respect to different predetermined orientations and resulting in different twist angles of the liquid crystal.

* * * * *